(12) United States Patent
Froeberg

(10) Patent No.: US 6,542,822 B1
(45) Date of Patent: Apr. 1, 2003

(54) DIRECTED USER-BASED DYNAMIC ADVERTISING

(75) Inventor: Peter L. Froeberg, Cupertino, CA (US)

(73) Assignee: Trimble Navigation Limited, Sunnyvale, CA (US)

(*) Notice: Subject to any disclaimer, the term of this patent is extended or adjusted under 35 U.S.C. 154(b) by 0 days.

(21) Appl. No.: 09/912,847

(22) Filed: Jul. 24, 2001

(51) Int. Cl.[7] .............................. G01C 21/28
(52) U.S. Cl. ............... 701/213; 701/207; 701/208; 701/211; 701/214; 340/988; 342/357.01; 342/357.06; 342/357.08
(58) Field of Search ................. 701/200, 201, 701/207, 208, 210, 211, 213, 214, 220, 224, 300; 340/988, 990, 995; 73/178 R; 342/357.1, 457, 357.02, 357.06, 357.08

(56) References Cited

U.S. PATENT DOCUMENTS 6,366,856 B1 * 4/2002 Johnson ....................... 701/213

* cited by examiner

Primary Examiner—Gertrude Arthur
(74) Attorney, Agent, or Firm—Wagner, Murabito & Hao LLP (57) ABSTRACT

A method and system for dynamically communicating content to an occupant of a moving vehicle according to the location and direction of travel of the vehicle. Multiple items of content are loaded onto the vehicle and updated at periodic intervals. Position information (such as Global Positioning System information) is used to determine the location of the vehicle. The direction of travel of the vehicle can also be determined from the position information. Using the vehicle's position and direction of travel as well as other factors such as the time of day, a particular item of content can be selected and communicated to an occupant of the vehicle.

30 Claims, 5 Drawing Sheets

DIRECTED USER-BASED DYNAMIC ADVERTISING

TECHNICAL FIELD

The present invention relates to the field of position determination systems. Specifically, the present invention pertains to a method for providing information to occupants of a mobile vehicle based on the vehicle's location and direction of travel.

BACKGROUND ART

Vehicles (e.g., automobiles) equipped with on-board navigation systems are becoming more common. These navigation systems typically rely on the Global Positioning System (GPS), or a similar type of positioning system, to determine the vehicle's position.

There are prior art applications in which the position information is used to target content (such as but not limited to advertising) to occupants of the vehicle based on the vehicle's location. This content is indexed by location and stored in a database residing on-board the vehicle. When the vehicle approaches a location contained in the database, the content associated with that location is communicated to the vehicle's occupants.

Such a system finds use, for example, when a user (e.g., a vehicle occupant) enters a query regarding the location of a particular type of merchant. For example, the user may request the location of the nearest hardware store or grocery store. Similarly, the user may request the nearest location of a particular restaurant, using the name of the restaurant. In response to the request, the prior art systems provide the location and perhaps other information, such as a map or directions.

A disadvantage to these prior art applications is that, while the prior art systems may provide the nearest location, it may not provide the location that is most convenient to the user. For example, the nearest location may be one block in the wrong direction down a one-way street, or one exit back on a freeway, with a more convenient location being a couple of blocks or exits ahead.

Therefore, what is needed is a system and/or method that can more effectively provide location-based content to users, in particular users who are occupants of a moving vehicle. The present invention provides a novel solution to this need.

DISCLOSURE OF THE INVENTION

The present invention provides a method and system that can more effectively provide location-based content to users, in particular users in a moving vehicle.

The present embodiment of the present invention pertains to a method and system for dynamically communicating content to an occupant of a moving vehicle according to the location and direction of travel of the vehicle. Multiple items of content are loaded onto the vehicle and updated at periodic intervals. Position information (such as Global Positioning System information) is used to determine the location of the vehicle. The direction of travel of the vehicle can also be determined from the position information. In the present embodiment, using the vehicle's position and direction of travel, a particular item of content can be selected and communicated to an occupant of the vehicle. In one embodiment, the content is displayed to the occupant; in another embodiment, the content is communicated audibly.

In one embodiment, the vehicle's position and direction of travel can be correlated to geographical information, and the geographical information can be factored into the selection of a particular item of content. The time of day can also be used to select a particular item of content. Other information, such as the vehicle's speed, can also be factored into the selection of content to be communicated to the vehicle's occupants.

In one embodiment, the multiple items of content loaded onboard the vehicle can be characterized according to the characteristics associated with the content. In another embodiment, the content can be specific to each user or occupant of the vehicle.

The present invention thus introduces new dimensions to the concept of providing content to users. In accordance with the present invention, content can be more precisely targeted by location, direction of travel, time of day, and/or other factors, making the content more relevant to users.

These and other objects and advantages of the present invention will no doubt become obvious to those of ordinary skill in the art after having read the following detailed description of the preferred embodiments that are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as to not unnecessarily obscure aspects of the present invention.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "selecting" or "displaying" or "determining" or "loading" or "using" or "updating" or "receiving" or "communicating" or "correlating" or the like, refer to actions and processes of a computer system (e.g., process 400 of FIG. 4), or similar electronic computing device, that manipulates and transforms data represented as physical (electronic) quantities within the computer system's registers and memories into other data similarly represented as physical quantities within the computer system memories or registers or other such information storage, transmission or display devices.

In the present embodiment, reference to a satellite position determination system, or "SATPOS" herein, refers to a Global Positioning System (GPS), to a Global Orbiting Satellite System (GLONASS), and to any other positioning system, including pseudolites, that provide signals that can be used to determine position. The terms "satellite position determination system" and "SATPOS," as used herein, are intended to include position determination using pseudolites or equivalents of pseudolites, and the terms "satellite position determination system signals" and "SATPOS signals," as used herein, are intended to include position determination system-like signals and data from pseudolites or equivalents of pseudolites. Also, signals from other sources such as LORAN, Wide Area Augmentation System (WAAS) satellites, etc., may be used to determine position.

Figure 1A:
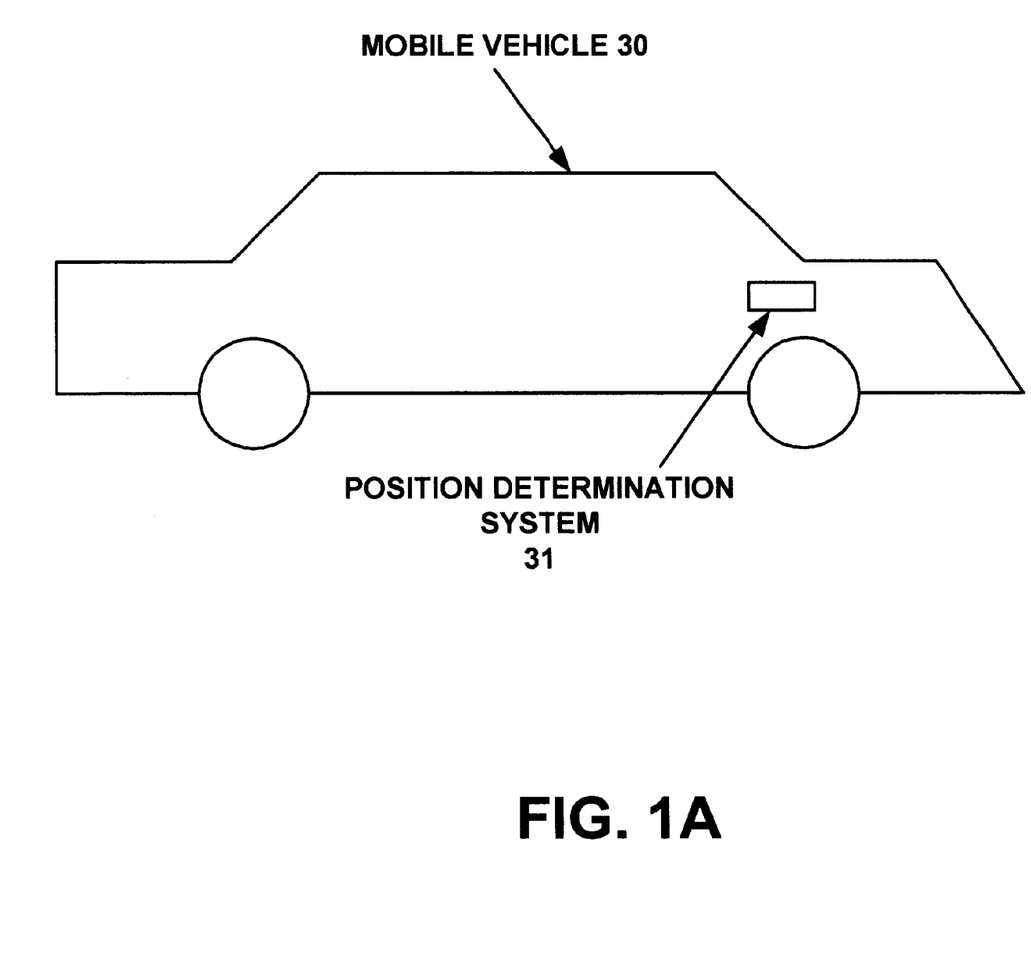
FIG. 1A is a side-perspective view illustrating an exemplary mobile vehicle with a position determination system in accordance with one embodiment of the present invention.

FIG. 1A is a side-perspective view illustrating one embodiment of a mobile vehicle 30 in accordance with the present invention. Although FIG. 1A depicts a particular type of mobile vehicle 30, it is appreciated that mobile vehicle 30 can be any mobile platform capable of transporting one or more occupants. Accordingly, mobile vehicle 30 may be a land vehicle such as an automobile or motorcycle, a marine vessel, or an airborne craft. In general, mobile vehicle 30 has the ability to determine the vehicle's position (e.g., latitude, longitude, and direction of travel) as well as its speed and the time of day. Mobile vehicle 30 also has the ability to display textual or graphical content to an occupant of the vehicle, and the ability to change the display from one item of content to another en route.

With reference still to FIG. 1A, in the present embodiment, mobile vehicle 30 includes a position determination system 31. In one embodiment, position determination system 31 is used to determine the location of mobile vehicle 30. In another embodiment, position determination system 31 is also used to determine the direction of travel of mobile vehicle 30. Position determination system 31 can also be used to determine the time of day, although it is appreciated that other mechanisms may be used instead. The speed of mobile vehicle 30 can be either determined using conventional means (e.g., a speedometer) or derived using position determination system 31.

Figure 1B:
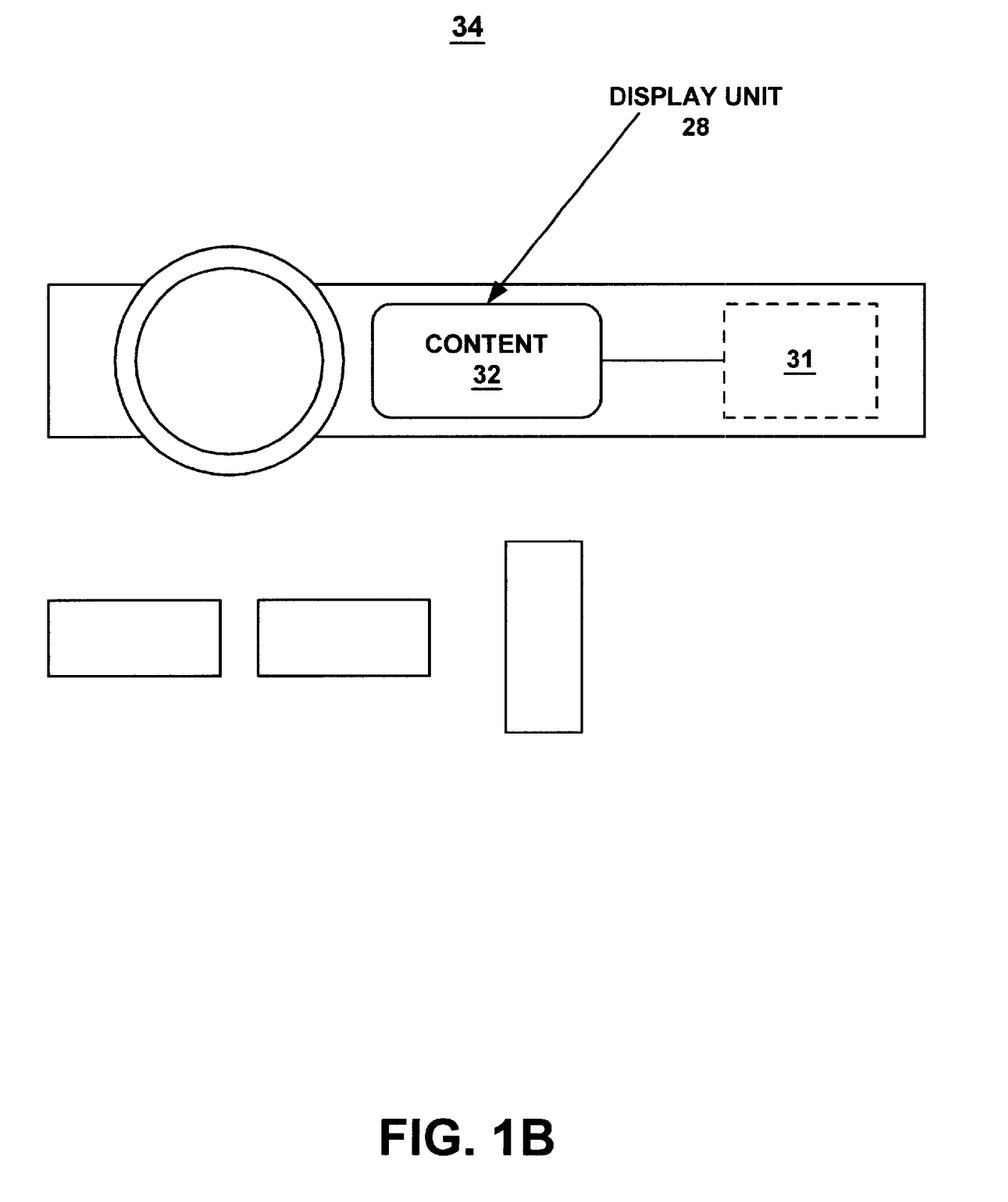
FIG. 1B is a representation of an exemplary vehicle interior showing a display unit in accordance with one embodiment of the present invention.

FIG. 1B is a representation of an exemplary vehicle interior 34 showing a display unit 28 in accordance with one embodiment of the present invention. Specifically, FIG. 1B shows a display unit 28 mounted in the dashboard of a mobile vehicle 30 (FIG. 1A). Display unit 28 is coupled to position determination system 31 and displays content 32 to the occupants of mobile vehicle 30. Display unit 28 can display content 32 which is changed as a function of spatial parameters (e.g., position and/or direction of travel of mobile vehicle 30) and/or temporal parameters. That is, the content 32 can be changed from one message to another while mobile vehicle 30 is en route, based on the vehicle's position and/or direction of travel, the time of day, and/or other factors.

In various embodiments, the display unit 28 may be a liquid crystal display device, a cathode ray tube (CRT), a field emission display device (also called a flat panel CRT), a thin film transistor (TFT) display device, an electroluminescent display device, a plasma display device, or another type of display device, electronic and otherwise, suitable for generating graphic images and alphanumeric characters for displaying messages. Display unit 28 may form part of a "heads-up" display (a display wherein a semi-transparent image is generated in, for example, the driver's line of sight).

It will be apparent to one of ordinary skill in the art that, in one embodiment, a audio unit capable of broadcasting an audible message can be used in combination with or instead of the display unit 28. The content 32 may thus also include a pre-recorded audible message, or the audible message may be generated using any of the various techniques and software programs available for converting text to voice.

Vehicle Position Determination System

Figure 2:
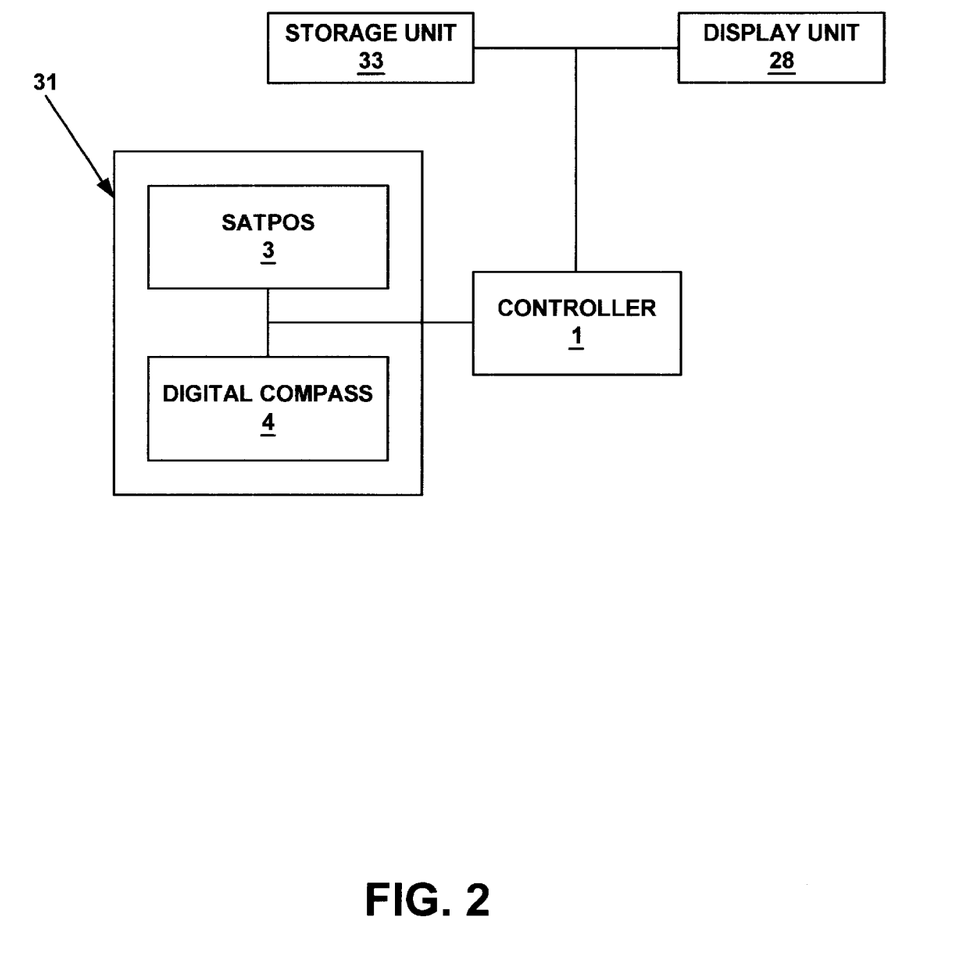
FIG. 2 is a block diagram of one embodiment of a position determination system in accordance with the present invention.

FIG. 2 is a block diagram of one embodiment of a position determination system 31 in accordance with the present invention. In the present embodiment, position determination system 31 includes Satellite Positioning System (SATPOS) 3 that is operable for determining position. In one embodiment, SATPOS 3 is adapted to determine position using a Satellite Positioning System such as the US Global Positioning System (GPS).

In the GPS embodiment, SATPOS 3 determines its location by analysis of satellite position determining signals such as signals from satellites of the US GPS. In one embodiment, position signal processing circuitry in SATPOS 3 also determines the direction of movement of SATPOS 3, also referred to as the heading, and couples the determined heading to controller 1. In this embodiment, direction of movement is determined by comparing satellite position determining signals received as the position determination system 31 moves.

In another embodiment, position determination system 31 also includes digital compass 4. Digital compass 4 is operable to determine direction and couple direction to controller 1. More particularly, in the present embodiment, digital compass 4 determines the compass direction that corresponds to the orientation of position determination system 31.

Continuing with FIG. 2, controller 1 controls the operation of position determination system 31. In one embodiment, controller 1 is a general-purpose computer. Alternatively, controller 1 can be an integrated circuit device such as a processor, microcontroller, Application Specific Integrated Circuit (ASIC) device, or Field Programmable Gate Array (FPGA) device operable to execute instructions contained in one or more software program(s). Controller 1 can be integrated with position determination system 31 as a single unit, or controller 1 and position determination system 31 may be coupled as separate units.

In the present embodiment, controller 1 is coupled to a storage unit 33 and to display unit 28. Storage unit 33 is for storing multiple items of the content 32 (FIG. 1B) that are to be displayed on display unit 28. Accordingly, in one embodiment, controller 1 can select from storage unit 33 the appropriate item of content 32, depending on the position and/or direction of travel of mobile vehicle 30 (FIG. 1A), as well as other information as described in conjunction with FIG. 4, below. In another embodiment, controller 1 can also select the appropriate item of content 32 from storage unit 33 depending on the time of day and/or the speed of mobile vehicle 30.

It is appreciated that, although the present invention is described for a visual display, the content 32 can also be audibly broadcast in combination with or instead of the display, using either pre-recorded audible messages or any of the various techniques and software programs available for converting text to voice.

Continuing with reference to FIG. 2, content 32 can be embodied in storage unit 33 as, for example, magnetic, optical, or electronic data that are converted into a visible display or audible message. Storage unit 33 can be a Random Access Memory (RAM) device such as, for example, a Static Random Access Memory (SRAM) device or a Dynamic Random Access Memory (DRAM) device. Alternatively, other types of memory storage devices such as flash memory, Read Only Memory (ROM), tape, CD ROM, or DVD may be used.

Figure 3:
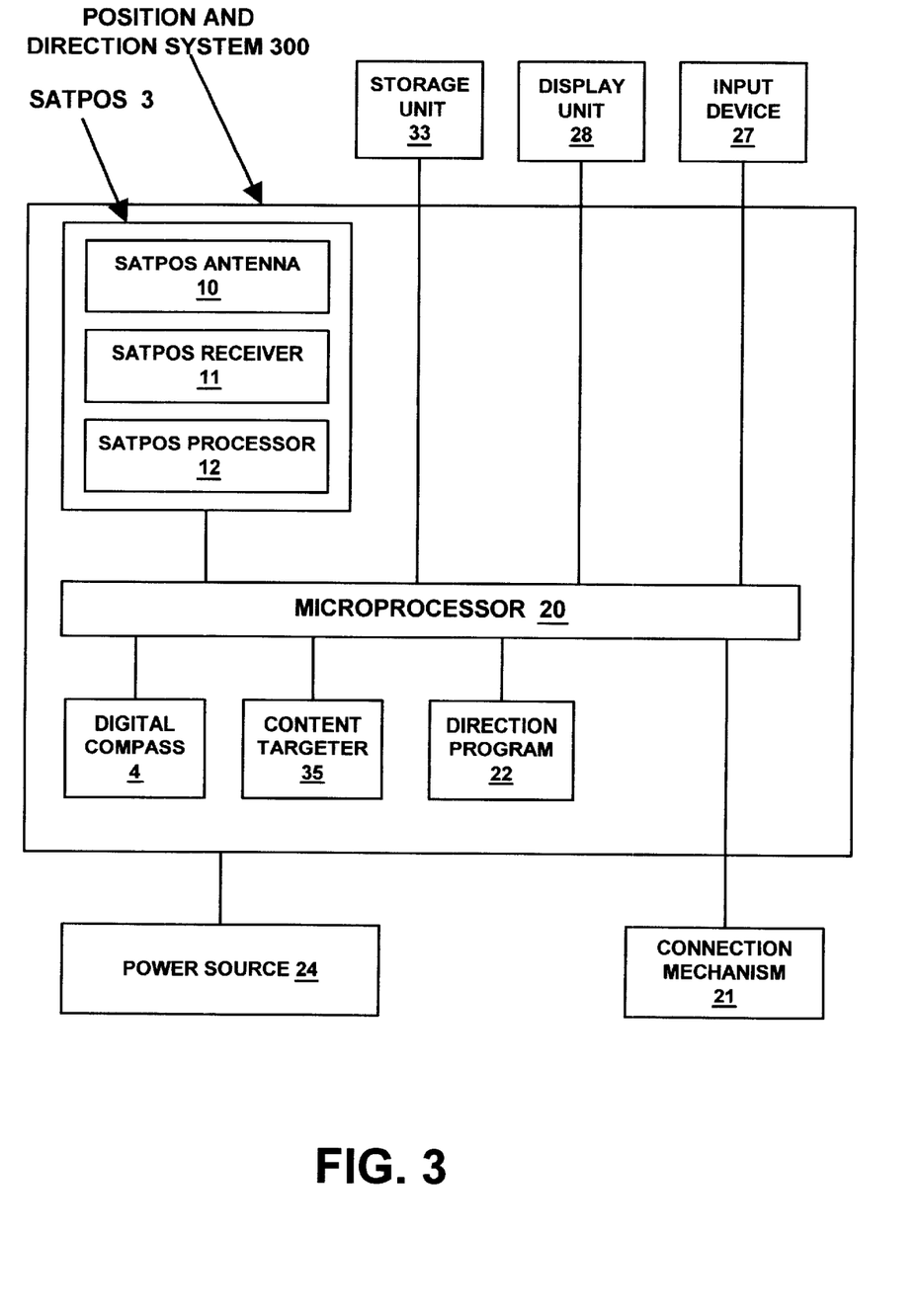
FIG. 3 is a block diagram of one embodiment of an integrated position and direction system in accordance with the present invention.

FIG. 3 is a block diagram of one embodiment of an integrated position and direction system 300 in accordance with the present invention. Integrated position and direction system 300 is shown to include SATPOS 3 that is operable for determining position. In the present embodiment, SATPOS 3 includes SATPOS antenna 10, SATPOS receiver 11, and SATPOS processor 12.

In one embodiment, SATPOS processor 12 is a GPS processor made by Trimble Navigation, Ltd., of Sunnyvale, Calif. In this embodiment, SATPOS antenna 10 is an ACE II GPS™ antenna, manufactured by Trimble Navigation, Ltd. and SATPOS receiver 11 includes a SIERRA GPS™ chipset, manufactured by Trimble Navigation, Ltd. Although such a specific implementation is described, the present invention is also well suited to an embodiment having various other components and features.

In the present embodiment, microprocessor 20 performs the functions of controller 1 of FIG. 2. In the present embodiment, microprocessor 20 is a general-purpose microprocessor that has low power consumption such as, for example, a Motorola RISC (reduced instruction set computer) microprocessor made by Motorola Inc. of Austin, Tex. Alternatively, another type of processor, an ASIC device or a FPGA device can be used. In another embodiment, SATPOS processor 12 is used for controlling the operations of integrated position and direction system 300 instead of microprocessor 20; accordingly, there may be no need for a second processor such as microprocessor 20.

Storage unit 33 is coupled to microprocessor 20 and is adapted to store content 32 (FIG. 1B). Direction program 22 represents a memory unit comprising instructions that are operable on microprocessor 20 and that control the operations of integrated position and direction system 300. Content targeter 35 represents a memory unit comprising instructions that are also operable on microprocessor 20 and that control which item of content 32 is to be displayed on display unit 28, based on the position and/or direction of travel of mobile vehicle 30 (FIG. 1A) as determined by integrated position and direction system 300, and/or other factors. Although shown as separate elements in FIG. 3, it is understood that direction program 22 and content targeter 35 can be combined into a single memory unit.

Continuing with FIG. 3, power source 24 provides power to the various components of integrated position and direction system 300. Power source 24 may be any suitable power source that is light-weight and compact such as, for example, built-in rechargeable batteries, size AA batteries, or size AAA batteries. Alternatively, integrated position and direction system 300 can be powered by mobile vehicle 30 (FIG. 1A).

Referring still to FIG. 3, in the present embodiment, connection mechanism 21 is coupled to microprocessor 20 and is adapted to connect to external devices such as, for example, external computer systems. This allows for easily and quickly downloading new programs for operation on microprocessor 20, and also allows for updating of storage unit 33 when content 32 is provided as electronic, magnetic, or optical data. Connection mechanism 21 also allows data to be downloaded from integrated position and direction system 300 to an external computer system. In one embodiment, connection mechanism 21 is a connector that complies with the RS-232 standard, although other types of connectors known in the art can be used.

In one embodiment, input device 27 is coupled to microprocessor 20 and allows for coupling user input to microprocessor 20. In the present embodiment, input device 27 includes function keys and an alphanumeric keypad. Alternatively, input device 27 includes a trackball, mouse, touch pad, joystick. The present invention is also well suited to receiving user input by other means such as, for example, voice commands.

It is appreciated that, although integrated position and direction system 300 is described as performing functions pertaining to the dynamic targeting of content, these functions can instead be performed by a separate device on board mobile vehicle 30 and coupled to integrated position and direction system 300.

Vehicle-Based Dynamic Advertising

Figure 4:
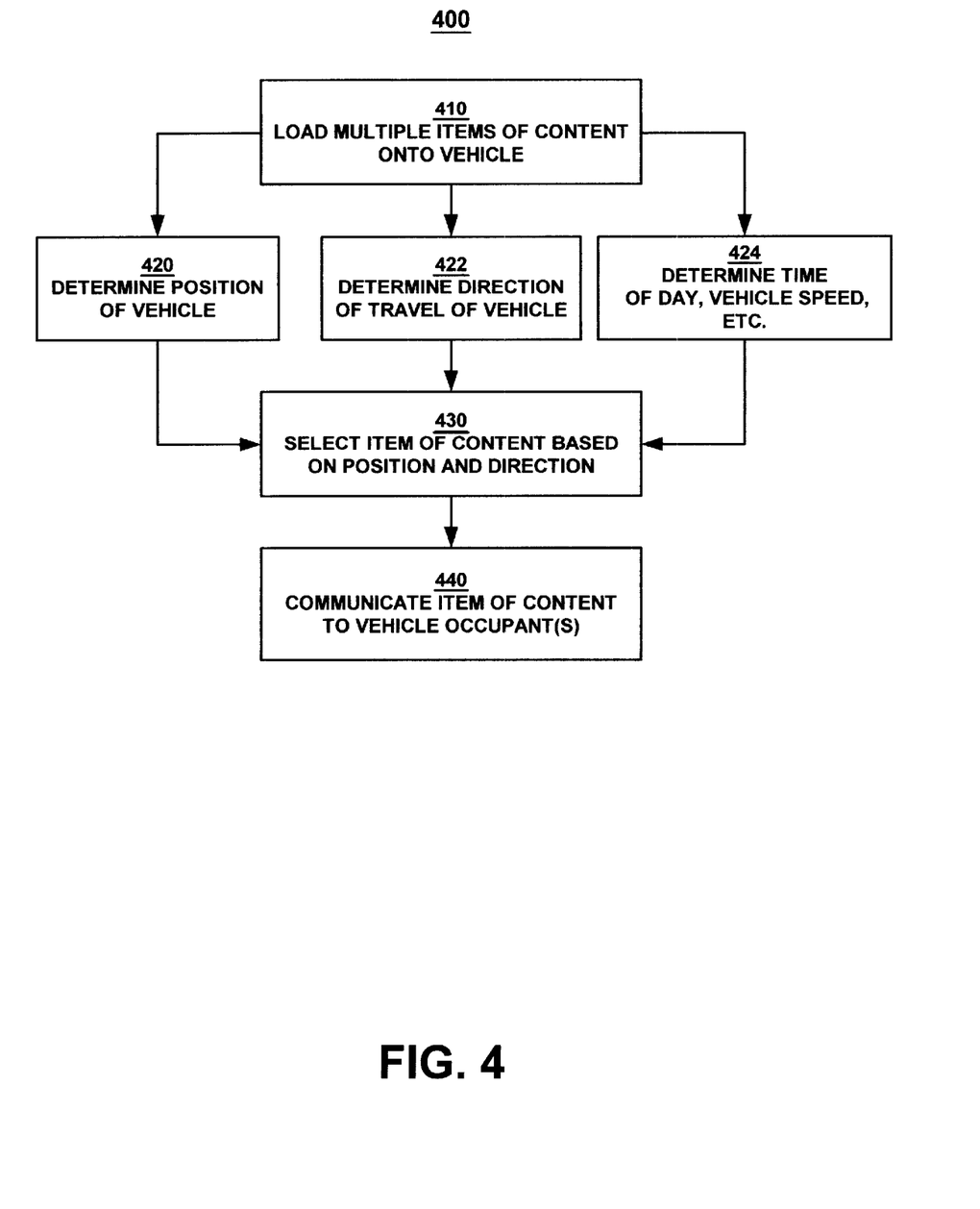
FIG. 4 is a flowchart of the steps in a process for dynamically targeting content to occupants of a mobile vehicle in accordance with one embodiment of the present invention.

FIG. 4 is a flowchart of the steps in a process 400 for dynamically targeting content 32 (FIG. 1B) to occupants of a mobile vehicle 30 (FIG. 1A) in accordance with one embodiment of the present invention. In the present embodiment, process 400 is implemented using elements of integrated position and direction system 300 (FIG. 3), as described below. However, it is appreciated that process 400 can also be implemented using a general purpose computer system (e.g., controller 1) in combination with a SATPOS 3 and/or a digital compass 4 (FIG. 2).

In step 410 of FIG. 4, with reference also to FIGS. 1A, 1B, 2 and 3, multiple items of content 32 are loaded on board mobile vehicle 30 (specifically, storage unit 33). In one embodiment, content 32 is manifested as electronic, magnetic or optical data that are loaded into storage unit 33 from, for example, an electronic computer system via connection mechanism 21.

In the present embodiment, content 32 includes a list of potential destinations indexed by location (e.g., latitude and longitude, map coordinates, or other positional information). Content 32 can also include messages, alerts, advertisements, or other information as a function of location-based information.

The multiple items of content 32 can be organized in many different ways. The content 32 can also be categorized according to the type of service(s) provided at a location (e.g., restaurant, grocery or hardware store, etc.), and further categorized according to other characteristics associated with the location (e.g., the type of restaurant, its name, etc.). Content 32 can include different sets of information for different users. For example, each user may indicate their preferences for certain restaurants while excluding other restaurants from their list of preferences.

In accordance with the present invention, users can employ various techniques for installing content 32 into storage unit 33. For example, a user can drive to particular location and, using input device 27, enter into storage unit 33 an item of content 32 specific to that location. In response to a command from the user, positional information for that location can be determined using position determination system 31 and indexed to the item of content 32 just entered by the user. In a similar fashion, items of content 32 can be generated on a home computer or the like and transferred to storage unit 33 (e.g., via connection mechanism 21). Content 32 can also be generated by commercial vendors that specialize in this type of service, and downloaded into storage unit 33 via connection mechanism 21, for example, or from a compact disk or similar storage medium.

At periodic intervals, regardless of its source, content 32 can be modified or updated; that is, items of content 32 can be added to or removed from storage unit 33.

In step 420 of FIG. 4, in the present embodiment, the position of mobile vehicle 30 is determined using SATPOS 3 (FIG. 2) or integrated position and direction system 300 (FIG. 3). In step 422, the direction of travel of mobile vehicle 30 is determined using digital compass 4 (FIG. 2) or integrated position and direction system 300. In one embodiment, process 400 also includes step 424, in which the time of day, the speed of mobile vehicle 30, or other such information is determined.

In step 430 of FIG. 4, a particular item of content 32 is selected based on the position of mobile vehicle 30, the direction of travel of mobile vehicle 30, the time of day, the speed of the vehicle, or some combination thereof. It is appreciated that other factors can also be considered when selecting a particular item of content 32 to be communicated (e.g., displayed).

Databases containing geographical information are known in the art. In one embodiment, by comparing the position and direction of travel to known infrastructures (e.g., highways, etc.) in a geographical database, mobile vehicle 30 can be placed on a freeway, a one-way street, or the like. This information can be used to more intelligently select a particular item of content 32 to be communicated (displayed). That is, instead of selecting the item of content 32 that may be closest to mobile vehicle 30, an item of content 32 more conveniently located can be selected. For example, when the position and direction of travel indicate that mobile vehicle 30 is on a freeway, a destination two exits ahead on the freeway can be selected instead of a destination one exit back.

In step 440 of FIG. 4, and continuing with reference also to FIGS. 1A, 1B, 2 and 3, the content 32 selected in step 430 is retrieved from storage unit 33 and displayed on display unit 28. Information associated with content 32 can also be displayed, such as a map or directions describing a suggested route to the destination identified by content 32. It is also appreciated that, although process 400 is described for a visual display, the content 32 can also be audibly communicated to the occupants of the mobile vehicle 30 in combination with or instead of the display, using either pre-recorded audible messages or any of the various techniques and software programs available for converting text to voice.

The content 32 can be communicated to the user in either an automatic mode or a manual mode. For example, based on user preferences identified in step 410 above, items of content 32 can be selected and communicated as mobile vehicle 30 passes near destinations satisfying those preferences. That is, based on the position and direction of travel of mobile vehicle 30, and the position of a destination identified in storage unit 33, the user can be alerted that the destination is within a certain distance (e.g., a certain number of miles). The user can also specify (e.g., via input device 27) that he or she wishes to be alerted to all items of content 32 within a user-defined distance. Furthermore, items of content 32 can be selected in response to a query from a user; for example, using input device 27, the user makes an inquiry regarding the nearest (and most convenient) restaurant of a certain type or by name.

In accordance with the present invention, as spatial, temporal or other factors change, the content 32 displayed on display unit 28 can be dynamically changed from one item to another, as described above in steps 420, 422, 424 and 430. That is, for example, as mobile vehicle 30 moves or changes direction, the content 32 that is displayed can be changed en route.

Thus, the present invention provides a method and system that can more effectively provide location-based content to users, in particular users in a moving vehicle. In accordance with the present invention, content can be more precisely targeted by location, direction of travel time of day, and/or other factors, making the content more relevant to users. The present invention thus introduces new dimensions to the concept of providing content to users.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. In a mobile vehicle, an apparatus for dynamically communicating content according to location-based information, said apparatus comprising:

a position determination system adapted to determine a position of said vehicle and a direction of travel of said vehicle;

a controller coupled to said position determination system;

a memory unit coupled to said controller, said memory unit adapted to store multiple items of content on board said vehicle; and a user interface coupled to said storage unit, said user interface adapted to communicate an item of content to an occupant of said vehicle;

wherein said controller selects said item of content from said multiple items of content according to said position and said direction of travel and wherein said item of content is associated with a location that is closer to said position and said direction of travel relative to others of said multiple items of content.

2. The apparatus of claim 1 comprising:

a receiver coupled to said position determination system and adapted to receive transmitted position information used by said position determination system to determine said position and said direction of travel.

3. The apparatus of claim 2 wherein said position information is Global Positioning System (GPS) information.

4. The apparatus of claim 3 wherein said position determination system comprises:

a digital compass adapted to determine said direction of travel using said GPS information; and a satellite positioning system adapted to determine said position using said GPS information.

5. The apparatus of claim 1 wherein said item of content is also selected according to a time of day.

6. The apparatus of claim 1 wherein said position and direction of travel are correlated to geographical information in a database, wherein said item of content is also selected according to said geographical information.

7. The apparatus of claim 1 wherein said multiple items of content stored on board said vehicle are user-specific.

8. The apparatus of claim 1 wherein said multiple items of content are categorized using characteristics associated with each item of content.

9. The apparatus of claim 1 wherein said user interface comprises a display unit operable to visually communicate said item of content.

10. The apparatus of claim 1 wherein said user interface comprises an audio unit operable to audibly communicate said item of content.

11. A method of dynamically communicating content according to location-based information, said method comprising the steps of:

a) determining a position and a direction of travel of a mobile vehicle, said mobile vehicle having a user interface for communicating content to an occupant of said mobile vehicle;

b) selecting an item of content from multiple items of content stored on board said mobile vehicle, wherein said item of content is associated with a location that is closer to said position and said direction of travel relative to others of said multiple items of content; and c) communicating said item of content to said occupant using said user interface.

12. The method as recited in claim 11 wherein said step a) comprises the step of:

receiving position information at said mobile vehicle, said position information for determining said position and said direction of travel of said vehicle.

13. The method as recited in claim 12 wherein said position information is Global Positioning System (GPS) information.

14. The method as recited in claim 13 wherein said mobile vehicle comprises a position determination system comprising a digital compass adapted to determine said direction of travel using said GPS information and a satellite positioning system adapted to determine said position using said GPS information.

15. The method as recited in claim 11 wherein said item of content is also selected according to a time of day.

16. The method as recited in claim 11 wherein said step b) further comprises the step of:

correlating said position and said direction of travel to geographical information in a database, wherein said item of content is also selected according to said geographical information.

17. The method as recited in claim 11 wherein said multiple items of content stored on board said vehicle are user-specific.

18. The method as recited in claim 11 wherein said multiple items of content are categorized using characteristics associated with each item of content.

19. The method as recited in claim 11 wherein said step c) comprises the step of:

communicating said item of content visually using a display unit.

20. The method as recited in claim 11 wherein said step c) comprises the step of:

communicating said item of content audibly using an audio unit.

21. A method of dynamically communicating content according to location-based information, said method comprising the steps of:

a) loading multiple items of content into a storage unit on board a mobile vehicle;

b) selecting an item of said content according to a position of said mobile vehicle and a direction of travel of said mobile vehicle, wherein said item of content is associated with a location that is closer to said position and said direction of travel relative to others of said multiple items of content; and c) communicating said item of content to an occupant of said mobile vehicle.

22. The method as recited in claim 21 wherein said step b) further comprises the step of:

receiving position information at said mobile vehicle, said position information for determining said position and said direction of travel.

23. The method as recited in claim 22 wherein said position information is Global Positioning System (GPS) information.

24. The method as recited in claim 23 wherein said mobile vehicle comprises a position determination system comprising a digital compass adapted to determine said direction of travel using said GPS information and a satellite positioning system adapted to determine said position using said GPS information.

25. The method as recited in claim 21 wherein said step b) further comprises the step of:

correlating said position and said direction of travel to geographical information in a database, wherein said item of content is also selected according to said geographical information.

26. The method as recited in claim 21 wherein said step c) comprises the step of:

communicating said item of content visually using a display unit.

27. The method as recited in claim 21 wherein said step c) comprises the step of:

communicating said item of content audibly using an audio unit.

28. The method as recited in claim 21 wherein said multiple items of content stored on board said vehicle are user-specific.

29. The method as recited in claim 21 wherein said multiple items of content are categorized using characteristics associated with each item of content.

30. The method as recited in claim 21 wherein said item of content is also selected according to a time of day.

* * * * *